Dec. 31, 1946.  W. T. HANNA  2,413,448
STOKER CONVEYER
Original Filed Jan. 12, 1940  4 Sheets-Sheet 3

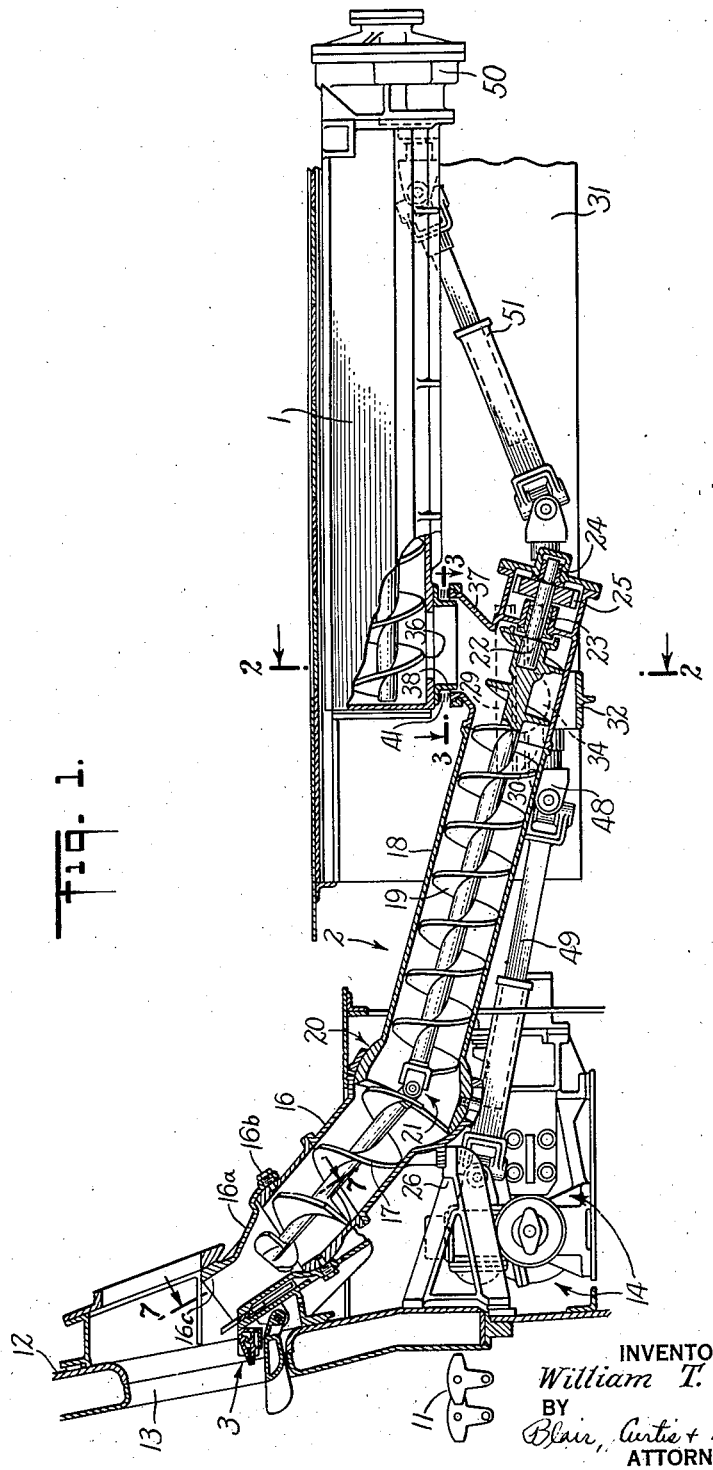

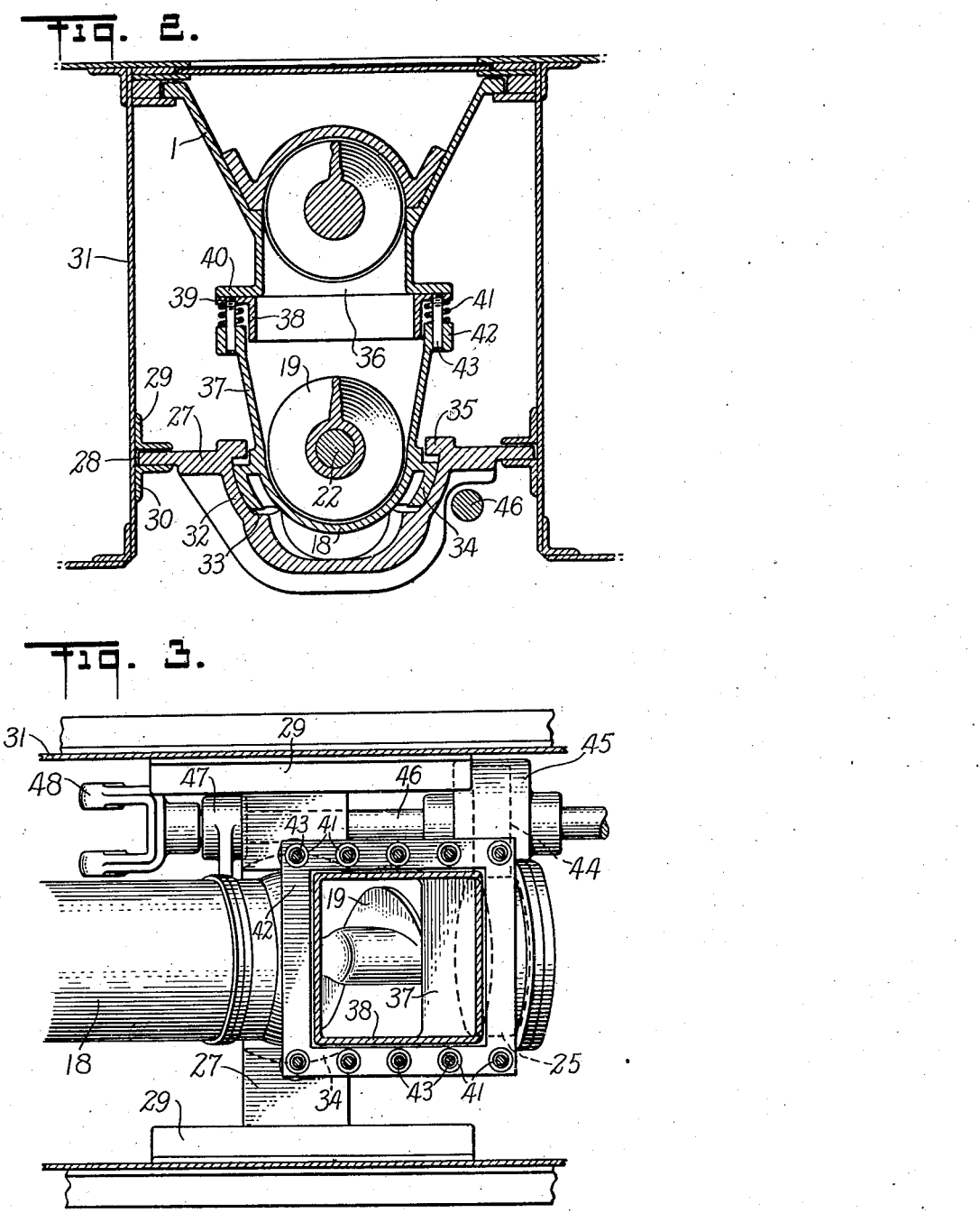

INVENTOR
William T. Hanna
BY
Blair, Curtis + Hayward
ATTORNEYS

Patented Dec. 31, 1946

2,413,448

UNITED STATES PATENT OFFICE 2,413,448

STOKER CONVEYER

William Thompson Hanna, Cincinnati, Ohio

Original application January 12, 1940, Serial No. 313,599, now Patent No. 2,351,959, dated June 20, 1944. Divided and this application December 29, 1942, Serial No. 470,439

13 Claims. (Cl. 198—15)

This invention relates to stokers and more particularly to those adapted for firing locomotives. Stokers of this type have a conduit conveying system extending from beneath the coal bin on the locomotive tender up to the fire box of the locomotive. The discharge end of the conveying system terminates at the fire box and discharges coal through a firing opening into the fire box.

In such a stoker the conveying system between the hopper and the discharge end includes a cylindrical conduit system and a screw conveyer system operating in the conduit. It is important that the delivery end of the conduit, which extends up through the floor of the locomotive cab, take up as little room as possible in the cab. To this end the conveying system extending between the hopper and the fire box is frequently divided into universally joined sections, which sections lie at an angle to one another. The conveyer screw, in such circumstances, is made up in sections, joined by universal joints coincident with the universal joints joining the conduit sections. In this way the conveyer screw system may operate freely within the angularly arranged conduit.

Also, since the locomotive and the tender are subject to angular as well as lengthwise displacement with respect to each other, provision must be made in the conveyer system extending between the hopper and the fire box for such displacement. To this end the conduit and conveyer sections are universally connected when required and provision is also made for elongation of the conveyer system.

It is an object of the present invention to provide an improved conveyer system.

The invention accordingly consists in the features of construction, combinations of elements, and arrangements of parts as will be exemplified in the structure to be hereinafter described, and the scope of the application of which will be indicated in the following claims.

In the drawings:

Figure 1 is a vertical longitudinal section of a stoker conveying system embodying the invention;

Figure 2 is a vertical section taken on line 2—2 of Figure 1;

Figure 3 is a horizontal section taken on line 3—3 of Figure 1;

Figure 4:
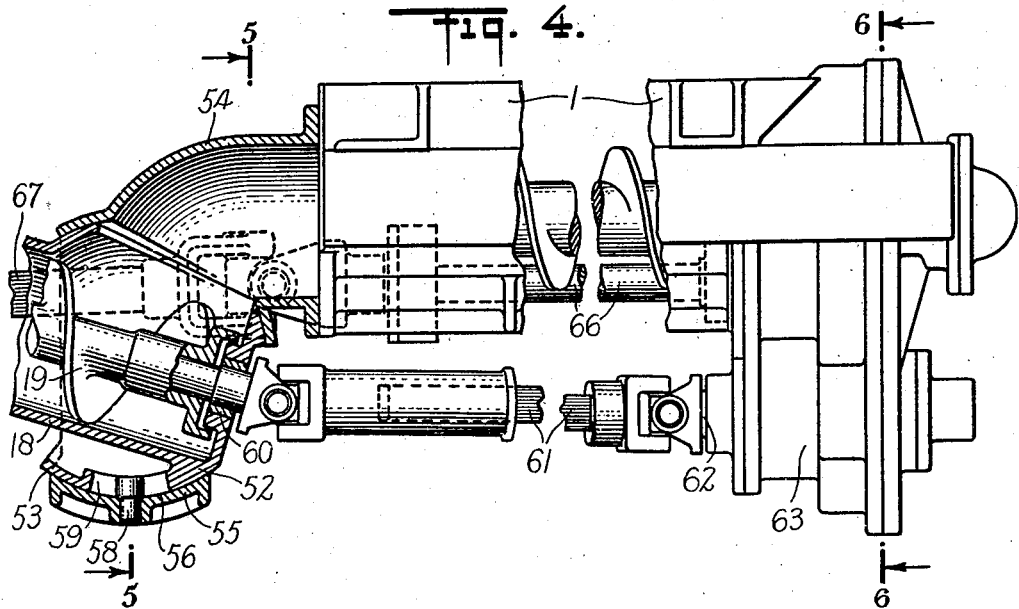
Figure 4 is a detailed vertical longitudinal section of a modification.
Figure 5:
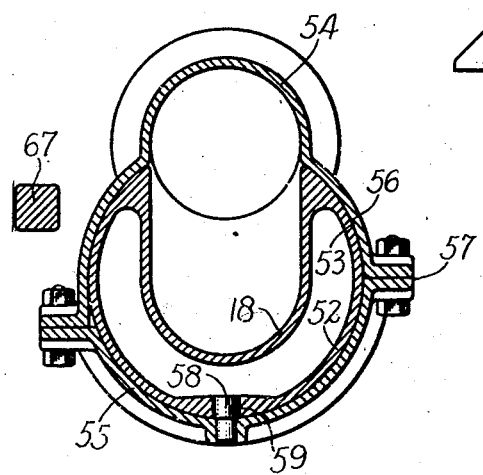
Figure 6:
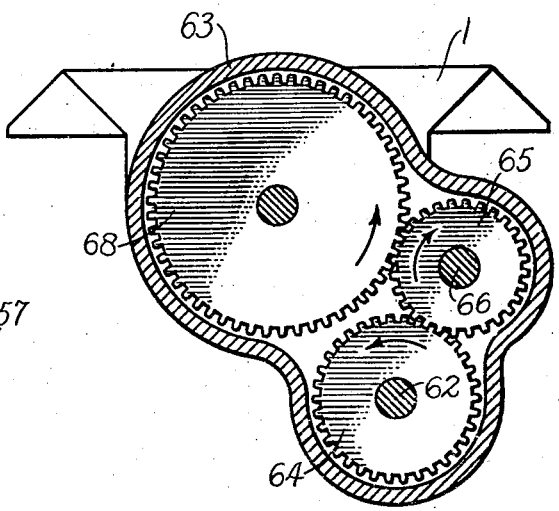
Figure 7:
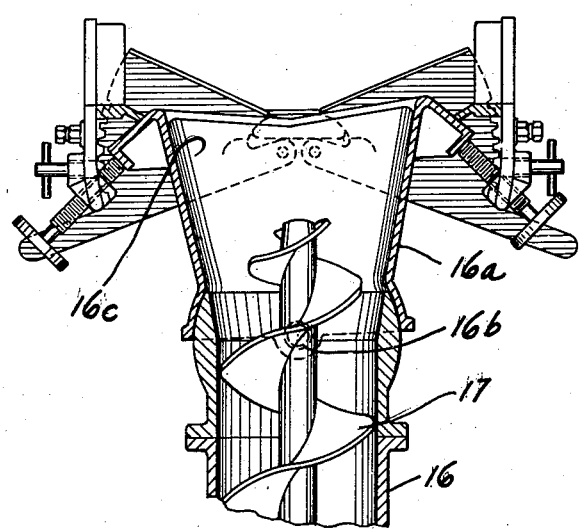

Figures 5 and 6 are vertical, transverse sections taken respectively on lines 5—5 and 6—6 of Figure 4; and Figure 7 is a detailed section taken on line 7—7 of Figure 1 and showing a mouthpiece of the stoker adjusted to the left of the vertical medial plane of the stoker.

Similar reference characters refer to similar parts throughout the various views of the drawings.

Referring to Figure 1, part of a locomotive backhead 12 is shown, and grate bars 11 inside the fire box are indicated. In the backhead is a firing opening 13.

Beneath the coal bin on the tender (and diagrammatically indicated) is located a hopper 1. Coal is conveyed from the forward end of the hopper upwardly through a transfer conduit system generally indicated at 2 to distributing apparatus generally indicated at 3, and described more fully in my copending application, Serial No. 313,599, filed January 12, 1940, upon which U. S. Letters Patent, No. 2,351,959, were issued on June 20, 1944, of which this present application is a division. As will be described, coal is moved through the hopper and transfer conduit system by means of a series of screw conveyers suitably driven from a source of engine power including an engine and reducing gear train located below the locomotive cab and generally indicated at 14.

In the conveying system as shown coal moves through a hopper 1, beneath the coal bin of the tender, to a downwardly extending discharge opening in the hopper, whence the coal passes through a downwardly extending throat to the rearward end of a transfer conduit 18. This conduit 18 extends upwardly and forwardly to an elevating conduit 16 rigidly fixed to the locomotive. This conduit 16 discharges coal through the firing opening 13. The elevating conduit 16 extends upwardly through the cab floor at a relatively steep angle and so occupies little space within the locomotive cab. By arranging the transfer conduit 18 in such a manner that it extends upwardly and forwardly from below the hopper to the elevating conduit, the angle between the conduit 18 and the elevating conduit 16 is reduced. And, as will be described, the efficiency of the transfer system is improved.

The transfer conduit 18 is so connected with the hopper that the conduit has both universal and longitudinal movement with respect to the hopper. The conduit 18 is connected with the elevating conduit 16 with a universal joint, generally indicated at 20. Within the conduits 18 and 16 are mounted screw conveyers, respectively numbered 19 and 17, which screw conveyers are universally joined at a joint, generally indicated at 21, and through which joint the conveyer 19 drives the conveyer 17. As will be described, the rearward end of conveyer 19 is mounted on a short shaft 22 rotatably mounted on the end of the conduit 18 but fixed against axial movement with respect to the conduit. The conveyer 19 is driven through this shaft 22.

As described in the above-mentioned patent application, Serial No. 313,599, now U. S. Patent No. 2,351,959, the upper end of the elevating conduit section 16 terminates in a conduit section 16a, pivoted about an axis 16b, and which conduit section is provided with a mouth 16c. This section 16a may be adjusted about axis 16b to offset the effect of the screw conveyer 17 to tend to feed more coal to one side of the fire box than to the other side thereof.

The outer shell of the universal connection 20 is fixed with respect to the locomotive and backhead by a frame construction 26 extending rearwardly from the locomotive backhead, so that the riser conduit 16 has no angular or longitudinal motion with respect to the backhead. Since the conduit 18 is of a fixed length and has only angular and no axial movement with respect to the conduit 16, and since screw conveyer 19 has no axial movement with respect to the conduit 18, the universal joint 21 between the screw conveyers 17 and 19 is always definitely located with respect to the universal joint 20 between the conduits 16 and 18, and this location is chosen to obtain the most efficient operation of the universal connection 21.

This construction provides for the most efficient operation of the conveyer screws within the transfer conduit system, and at the same time provides for the angular motion which necessarily is caused to take place between the conduits 16 and 18 by reason of motion between the locomotive and tender that results from going around curves or over uneven track beds.

Since the hopper 1 is rigidly mounted on the tender, longitudinal and universal movement is provided for between the hopper 1 and the rearward end of the transfer conduit 18 in the following manner:

Referring to Figure 2, the rearward end of the transfer conduit is carried by a saddle 27 slidably mounted in channels 28 formed by upper and lower angle irons 29 and 30 secured to and extending inwardly from the tender frame 31. With this construction the saddle 27 is movable forwardly and rearwardly with respect to the tender frame, and with respect to the tender hopper 1 and thus provides for longitudinal displacement between the rear end of conduit 18 and the hopper 1.

To provide for universal movement between the saddle 27 and the rearward end of the conduit 18, the saddle is provided with a downwardly depending apron 32 having internal spherically contoured surfaces 33. Likewise the rearward end of the conduit 18 has flange portions 34 having external spherically contoured surfaces receivable by the spherically contoured surfaces 33. In this manner the rearward end of the conduit is universally supported by the saddle 27. Overhanging flanges 35 are provided to keep the flange 34 riding in its seat.

The passage of coal from the hopper to the screw conveyer 19 in the conduit 18 is provided for by means of a downwardly directed discharge port 36 provided at the delivery end of the hopper 1 which opens into an upwardly extending receiving throat formed by walls 37 extending upwardly from the rearward end of the conduit 18. As shown in Figure 3, this upwardly extending throat is rectangular in cross section and as shown in Figure 2 it terminates below the discharge opening of the tender hopper.

Located within the upwardly extending throat formed by the walls 37 and extending upwardly therefrom is a sealing collar 38 provided with an outwardly extending flange 39 adapted to slidably seat against a corresponding flange 40 extending outwardly from the discharge opening 36. The sealing collar is kept in sealing contact with the discharge opening 36 by means of compression springs 41 between the flange 39 and a flange 42 provided around the top of the upwardly extending side walls 37. The springs 41 are maintained in position by suitable studs 43 threaded into and extending downwardly from the flange 39. This construction serves to provide sufficient free movement in all directions between the upwardly extending throat formed by the walls 37 and the downwardly extending discharge opening 36. The sealing collar serves to prevent the escape of dust and the entrance of foreign material.

The short drive shaft 22 mounted in the conduit 18 and driving conveyer 19, has fixed on it a gear 25, which meshes with and is driven by a gear 44 shown in dotted lines in Figure 3 and housed within a housing 45, carried on the rearward end of conduit 18. The housing 45 is cut away to permit the gears 44 and 25 to mesh. The gear 44 is keyed to and supported by a drive shaft 46 rotatably supported in suitable journals 47 also carried on the rearward end of conduit 18. As shown in Figures 1 and 3, the forward end of the shaft 46 has a yoke 48 universally connected to a telescoping floating drive shaft 49 driven by the reducing gear train and mounted in the locomotive. In this manner the drive shaft 46 is given free motion with respect to the power unit 14.

The screw conveyer within the hopper 1 is driven in the usual manner from its rearward end by gears within the housing 50 which in turn are driven by a telescoping shaft 51 connected to and extending rearwardly from the drive shaft 46.

Referring to Figures 4, 5, and 6, another form of universal connection is shown for locating the rearward end of the conduit 18 beneath the hopper.

Referring to Figure 4, the rearward end of the conduit 18 is provided with a flange 52 extending around the rearward end of the conduit, and is provided with a spherically contoured external surface 53. The forward end of the tender hopper is provided with a spout 54 opening downwardly and provided with an extension 55 having a spherically contoured inside surface 56 adapted to receive the spherically shaped surface 53 of the conduit 18. The extension 55 is broken at 57 so that it may be separated to receive the spherically shaped surface 53. Thereafter it is suitably bolted together.

A pin 58 extends inwardly from the lower portion of the extension 55 and rides in a slot 59 in the flange 52 to keep the conduit 18 properly aligned with the extension 55. In this manner free universal movement is provided for between the conduit 18 and the tender hopper 1, while providing an unrestricted passage for the coal from the tender hopper to the conveyer.

The screw conveyer 19 at its rearward end is mounted in a suitable bearing 60 at the rear end of the conduit and is driven from its rearward end by a telescoping shaft 61, as will be described.

The screw conveyer 19, as shown in Figure 4, is driven by the telescoping shaft 61 which, in turn, is universally connected to and driven by a shaft 62 located in a gear housing 63 and driven by a gear 64, see Figure 6. The gear 64 is driven by a gear 65 mounted on a shaft 66 suitably supported exteriorly of the tender hopper and driven by a telescoping shaft 67 extending forwardly to the power unit 14. The screw conveyer within the hopper is driven by a gear 68 which meshes with and is driven by the gear 65.

The bottom, rearward portion of the conduit 18 is cylindrically shaped inside the spherically contoured flange to provide efficient coaction between the screw conveyer 19 and the interior of the conduit, to move fuel forwardly from the lower end of the conduit 18 as the coal is delivered thereto from the tender hopper without interfering with the universal action of the joint.

As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. In a locomotive stoker for conveying coal from a locomotive tender to the firebox of the locomotive, the combination of a conduit section rigidly mounted on the locomotive, a conduit section rigidly mounted on the tender, a transfer conduit section intermediate said tender and locomotive sections, having its forward end universally connected with the rear end of said locomotive section and its rear end in offset relationship with the forward end of said tender section, and a delivery conduit section pivoted on the forward end of said locomotive section and adapted for adjusted lateral displacement relative to the firebox to regulate the lateral distribution of the coal to the firebox.

2. In a locomotive stoker for conveying coal from a locomotive tender to the firebox of the locomotive, the combination of a hopper fixed beneath the tender and having a delivery opening, a conduit section for receiving coal from said delivery opening and conveying it to the locomotive, a conveyer screw rotatably mounted in said conduit section and held against axial movement relative thereto, means for mounting the forward end of the conduit section on the locomotive for universal movement only with respect thereto, a saddle mounted on the tender and slidable horizontally with respect thereto, and means for mounting the rear end of the conduit section on the saddle to permit limited movement with respect thereto in all directions about a center lying on the axis of said conveyer screw.

3. In a locomotive stoker for conveying coal from a locomotive tender to the firebox of the locomotive, the combination of a hopper fixed beneath the tender and having a delivery opening, a conduit section for receiving coal from said delivery opening and conveying it to the locomotive, a conveyer screw rotatably mounted in said conduit section and held against axial movement relative thereto, means for mounting the forward end of the conduit section on the locomotive for universal movement only with respect thereto, a saddle mounted on the tender and slidable horizontally with respect thereto, bearing surfaces on said saddle constituting portions of a spherical surface, and complementary bearing surfaces on the rear portion of the conduit section engaging the first-mentioned bearing surfaces and constituting portions of a spherical surface having its center on the axis of said conveyer screw.

4. In a locomotive stoker for conveying coal from a locomotive tender to the firebox of the locomotive, the combination of a hopper fixed beneath the tender and having a delivery opening, a conduit section for receiving coal from said delivery opening and conveying it to the locomotive, a conveyer screw rotatably mounted in said conduit section and held against axial movement relative thereto, means for mounting the forward end of the conduit section on the locomotive for universal movement only with respect thereto, means for mounting the rear end of the conduit section on the tender in downwardly offset relation to the hopper and permitting limited movements of the conduit section relative to the hopper both longitudinally and about a center lying on the axis of said conveyer screw, and sealing means between said hopper delivery opening and the downwardly offset rear end of said conduit section.

5. In a locomotive stoker for conveying coal from a locomotive tender to the firebox of the locomotive, the combination of a hopper fixed beneath the tender and having a delivery opening, a conduit section for receiving coal from the delivery opening and conveying it to the locomotive, a conveyer screw rotatably mounted in said conduit section and held against axial movement relative thereto, means for mounting the forward end of the conduit section on the locomotive for universal movement only with respect thereto, means for mounting the rear end of said conduit section on the tender for longitudinal movement with respect thereto and also for relative movement about a center on the axis of said screw, and a resiliently pressed sealing collar interposed between the rear end of said conduit section and portions of the hopper adjacent the delivery opening.

6. In a locomotive stoker for conveying coal from a locomotive tender to the firebox of the locomotive, the combination of a hopper fixed beneath the tender and having a delivery opening, a conduit section for receiving coal from said delivery opening and conveying it to the locomotive, a conveyer screw rotatably mounted in said conduit section and held against axial movement relative thereto, means for mounting the forward end of said conduit section on the locomotive for universal movement only with respect thereto, means for mounting the rear end of said conduit section on the tender for longitudinal movement with respect thereto and also for relative movement about a center on the axis of said screw, a sealing ring movably carried by said conduit section and having a horizontal flange engaging the hopper adjacent said delivery opening and a vertical flange, a throat extending upwardly from the rear end of said conduit section and loosely receiving said vertical flange, and resilient means for pressing said horizontal flange toward the hopper.

7. In a locomotive stoker for conveying coal from a locomotive tender to the firebox of the locomotive, the combination of a hopper fixed beneath the tender and having a delivery opening, a conduit section for receiving coal from said delivery opening and conveying it to the locomotive, a conveyer screw rotatably mounted in said conduit section and held against axial movement relative thereto, means for mounting the forward end of said conduit section on the locomotive for universal movement only with respect thereto, a saddle mounted on the tender and slidable horizontally with respect thereto, bearing surfaces on said saddle constituting portions of a spherical surface, complementary bearing surfaces on the rear portion of said conduit section engaging the first-mentioned surfaces and constituting portions of a spherical surface having its center on the axis of said screw, a sealing ring movably carried by said conduit section and having a horizontal flange engaging the hopper adjacent said delivery opening and a vertical flange, a throat extending upwardly from the rear portion of said conduit section and loosely receiving said vertical flange, and resilient means for pressing said ring toward said hopper.

8. In a locomotive stoker for conveying coal from a locomotive tender to the firebox of the locomotive, the combination of a hopper fixed beneath the tender, an elevating conduit section fixed to the locomotive for delivering coal to the firebox thereof, a transfer conduit section for transferring coal from said hopper to said elevating conduit section, means for universally connecting the forward end of said transfer conduit section to the rear end of said elevating conduit section, a saddle mounted on the tender and slidable horizontally with respect thereto, means for mounting the rear end of said transfer conduit section on said saddle to permit limited movement in all directions about a center, a transfer conveyer screw rotatably mounted in said transfer conduit section with its axis passing through said center and held against longitudinal displacement with respect thereto, and a conveyer screw in said elevating conduit section universally connected to and driven by the forward end of said transfer conveyer screw, the center of the universal connection between said conveyer screws coinciding with the center of the universal connection between said conduit sections, whereby said last-mentioned centers will remain coincident notwithstanding relative displacements of locomotive and tender in use.

9. In a locomotive stoker for conveying coal forwardly from a locomotive tender to a firebox of the locomotive, the combination of a hopper fixed beneath the tender, an elevating conduit section fixed to said locomotive for delivering coal to the firebox thereof, a transfer conduit section for transferring coal from said hopper to said elevating conduit section, means for universally connecting the forward end of said transfer conduit section to said elevating conduit section, a saddle slidably carried by said tender, said saddle having a spherically shaped bearing surface, a complementary spherically shaped bearing surface on the rearward end of said transfer conduit section cooperating therewith, said spherically shaped bearing surfaces permitting relative movement therebetween about a center, a conveyer screw mounted in said transfer conduit section for rotational movement and held against longitudinal displacement with respect thereto, and a conveyer screw in said elevating conduit section universally connected to and driven by the forward end of said transfer conveyer screw, the mounting of said transfer conveyer screw being so constructed and arranged that the universal connection between said screw conveyers is held coincident with the universal connection between said conduit sections.

10. In a locomotive stoker for conveying fuel forwardly from a tender to a firebox of the locomotive, in combination, a hopper located beneath the tender and having a curved, downwardly opening delivery spout, a screw conveyer in said hopper for moving fuel to said spout, a cylindrically shaped transfer conduit for delivering fuel forwardly from said delivery spout to the locomotive, said delivery spout and said transfer conduit being provided with male and female spherically shaped surfaces forming a universal connection therebetween, and a transfer screw conveyer within said transfer conduit; part of said cylindrically shaped transfer conduit extending within said spherically shaped surfaces to provide a fuel support for said transfer screw conveyer to move fuel forwardly therethrough within the working confines of said transfer screw conveyer.

11. A locomotive stoker comprising, in combination, a fuel receiving hopper means adapted to be supported by a tender, a fuel delivering means adapted to be supported by a locomotive to deliver fuel to the firebox thereof, a fuel transfer conduit, and a fuel transfer screw; said transfer conduit being located between said receiving hopper means and said delivering means, said transfer screw being located within said transfer conduit, said transfer conduit being movably connected to one of said means by a coupling comprising male and female spherically shaped surfaces having a common center lying in the axis of said screw, said transfer screw extending into the interior of said coupling past said center, and said transfer conduit also extending into the interior of said coupling to keep fuel passing into the coupling within the bite of said transfer screw.

12. In a stoker for coal firing a locomotive, a conduit and screw feed system for conveying coal from a locomotive tender to the firebox of the locomotive comprising, a hopper located beneath said tender, and having a downwardly opening delivery opening, a conveyer screw in said hopper for moving coal to said opening, a transfer conduit for receiving fuel from said opening and transferring it forwardly to the locomotive, means on said tender for mounting the rearward end of said transfer conduit so that it may slide longitudinally and have limited movement about a center, a chute fixed to and extending upwardly from the rear end of said transfer conduit to a position beneath said delivery opening for receiving coal therefrom and sealing means received by said chute and spring pressed against the hopper wall bordering said delivery opening for preventing the escape of coal as it passes from said delivery opening to said chute.

13. In a stoker for coal firing a locomotive, a conduit and screw feed system for conveying coal from a locomotive tender to the firebox of the locomotive comprising, a hopper located beneath said tender and having a downwardly opening delivery opening, a conveyer screw in said hopper for moving coal to said opening, a transfer conduit for receiving fuel from said opening and transferring it forwardly to the locomotive, means on said tender for flexibly connecting the rearward end of said transfer conduit to the tender, a chute fixed to and extending upwardly from the rear end of said transfer conduit to a position beneath said delivery opening for receiving coal therefrom, sealing means received by said chute and spring pressed against the hopper wall bordering said delivery opening for preventing the escape of coal as it passes from said delivery opening to said chute, a conveyer screw in said transfer conduit, means for driving said transfer conveyer screw including a pinion shaft mounted on said transfer conduit to move therewith, a gear on said pinion shaft and a gear on the rear end of said transfer conveyer screw meshing with said gear, means for driving said pinion shaft and means for driving said hopper conveyer screw including a drive shaft driven from said pinion shaft.

WILLIAM THOMPSON HANNA.